A. WINTON & H. B. ANDERSON.
REAR AXLE DRIVING MECHANISM FOR AUTOMOBILES.
APPLICATION FILED SEPT. 7, 1905.
915,920.
Patented Mar. 23, 1909.
5 SHEETS—SHEET 5.
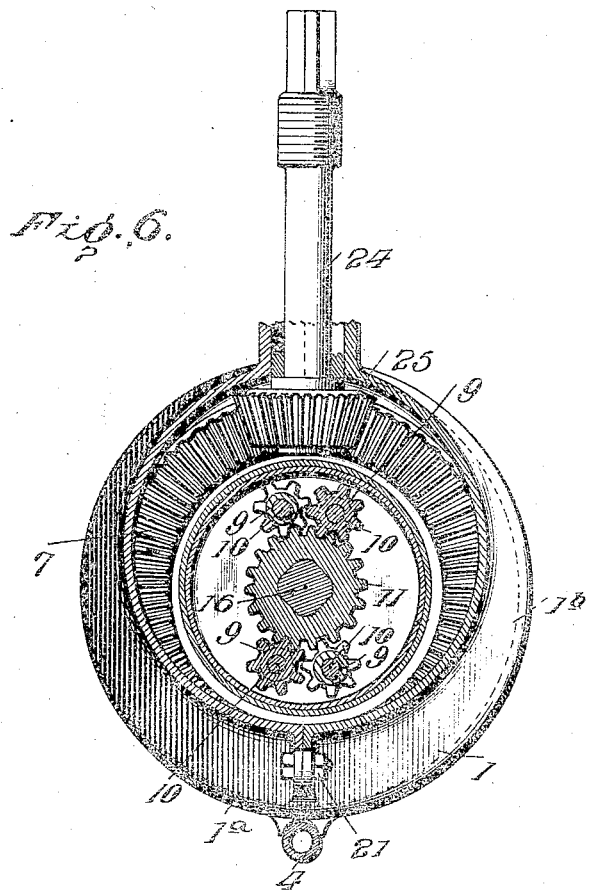
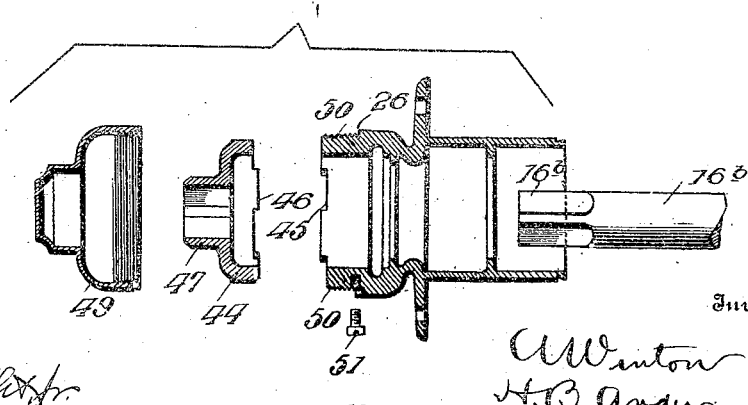
Witnesses
Inventors
A. Winton
H. B. Anderson
By A. S. Pattison
Attorney

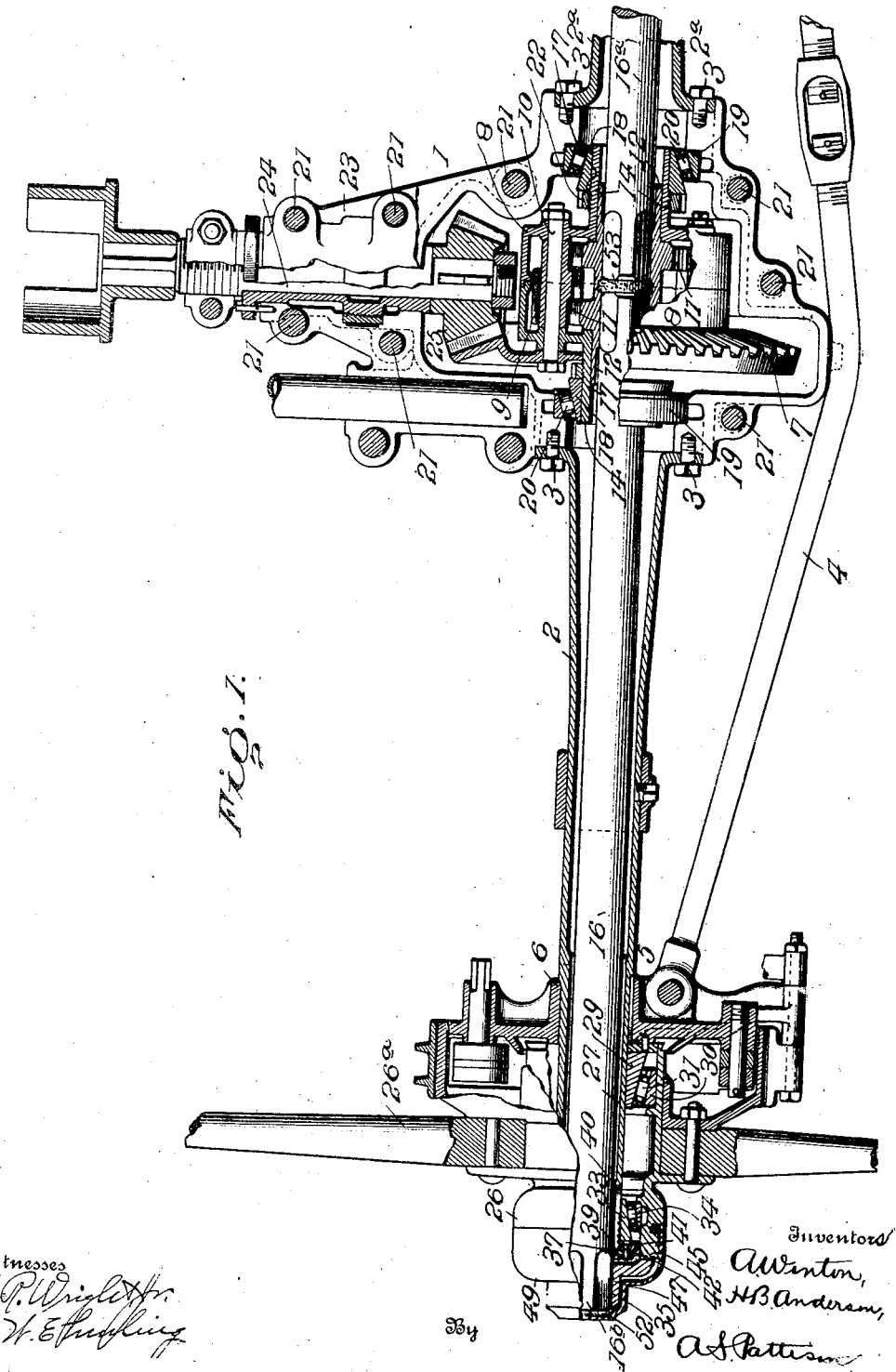

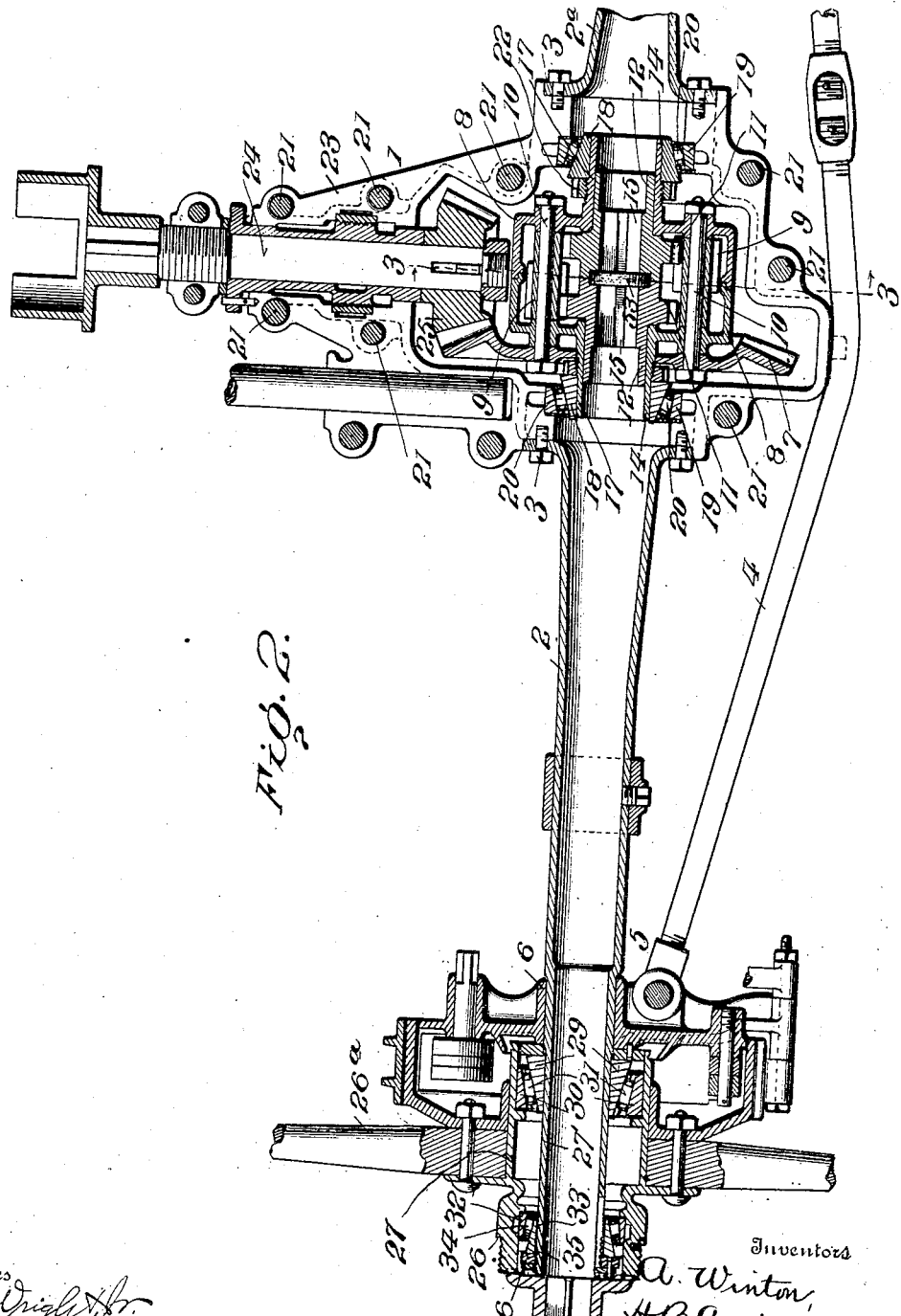

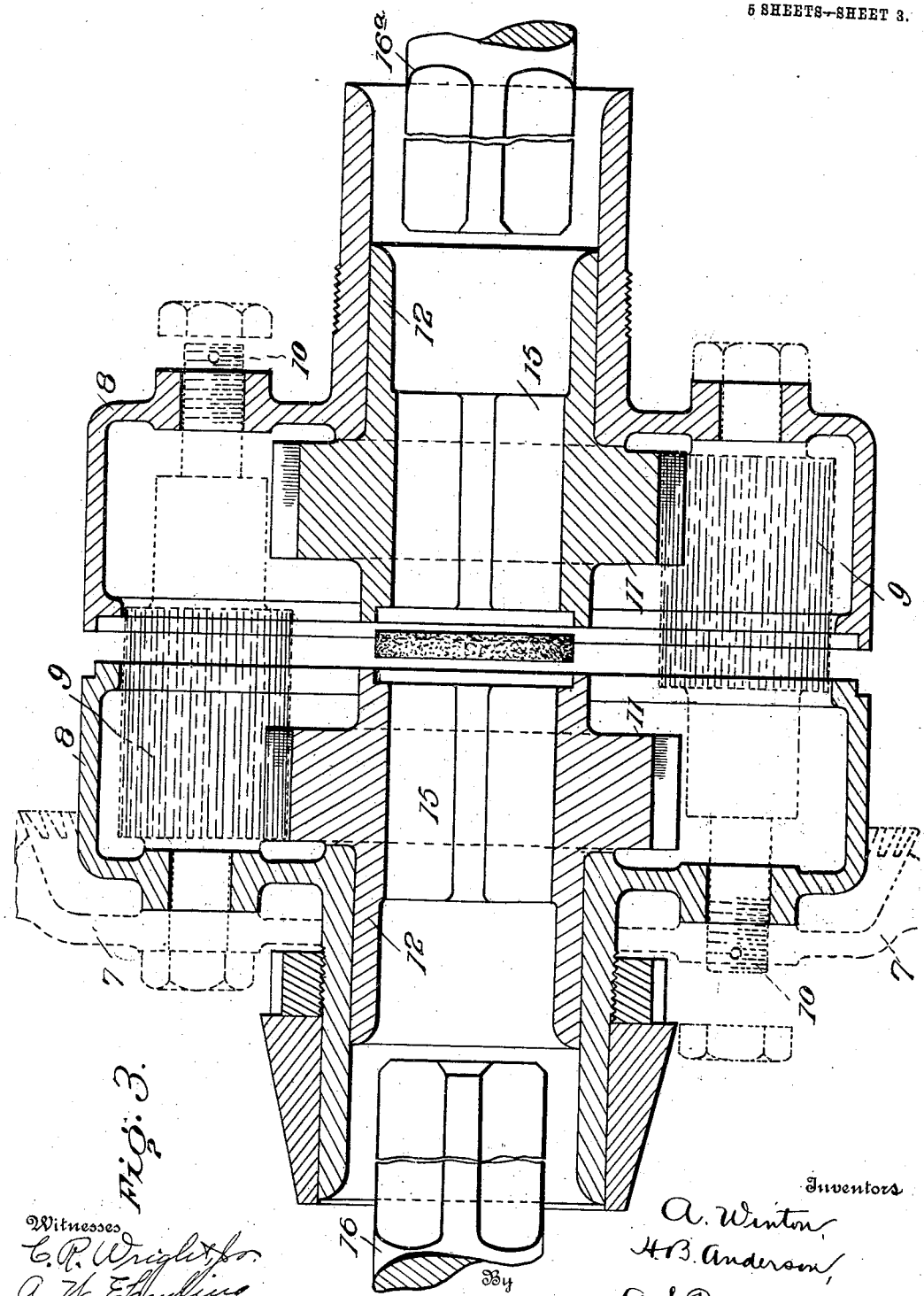

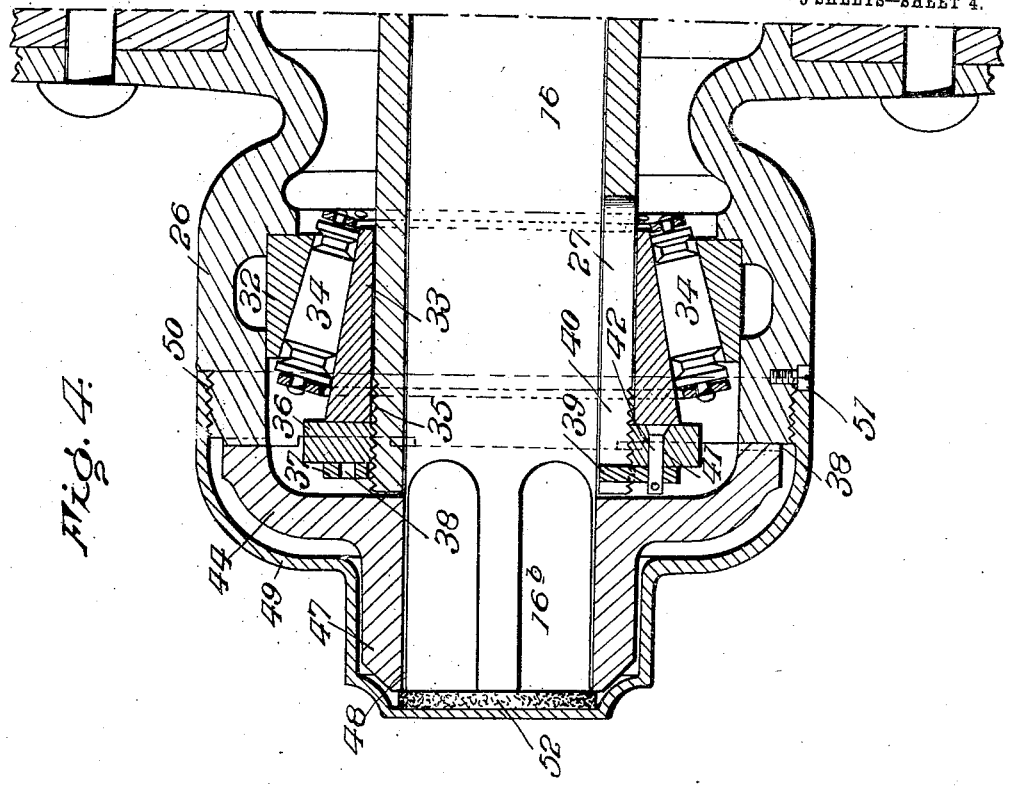
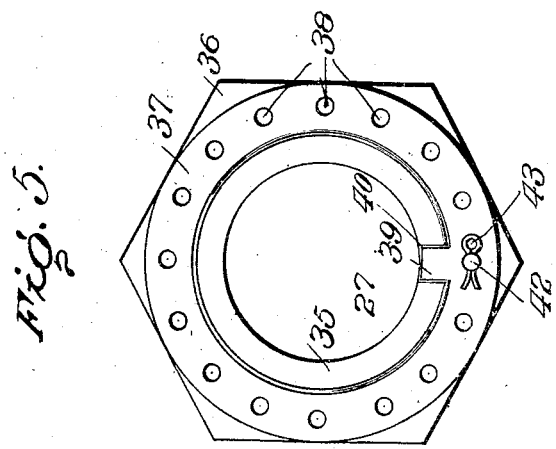

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

REAR-AXLE-DRIVING MECHANISM FOR AUTOMOBILES.

No. 915,820.   Specification of Letters Patent.   Patented March 23, 1909.

Application filed September 7, 1905. Serial No. 277,461.

*To all whom it may concern:*

Be it known that we, ALEXANDER WINTON and HAROLD B. ANDERSON, citizens of the United States, residing at Cleveland, in the county of Cuyahoga and State of Ohio, have invented a certain new and useful Improvement in Rear-Axle-Driving Mechanisms for Automobiles, of which the following is a specification, reference being had therein to the accompanying drawing.

This invention relates to improvements in rear axle driving mechanisms for automobiles, the three principal objects of which are, first: to support the compensating gear entirely independent of the driving axle, and thus hold it in alinement independent of the driving axle, which will enable the inner end of the axle to interlock with its gear or pinion of the compensating gear, by an inward movement of the axle, and permit its disengagement therefrom by an outward movement thereof. Second: To support the rear supporting and driving wheels of the automobile independent of the driving axle by journaling the said wheels upon an axle housing. Third: To provide a detachably interlocking member for locking the outer ends of the two part axle to the said wheels, whereby the removal of the interlocking member will permit the endwise removal of the shaft which it engages.

A rear axle driving mechanism constructed to obtain the foregoing objects, relieves the axle from any transverse strain, and will permit the axle to be inserted in the position and interlock with the compensating gear, and with the wheels, without the necessity of jacking up any portion of the machine, and places upon the axle housing all of the load, the axle merely serving to drive the wheels and receiving only a torsional strain.

In addition to the foregoing principal objects of the present invention, there are a number of other features which will be described hereinafter.

In the accompanying drawings, Figure 1, is a sectional view taken longitudinal one side of the rear driving axle, and through the compensating gear, the two axle sections being shown in position. Fig. 2, is a similar view with the axle sections removed. Fig. 3, is an enlarged sectional view through the compensating gear and its housing, the two parts which constitute the housing, being shown separated. Fig. 4, is an enlarged sectional view of the wheel hub, the outer end of the axle housing, the outer end of the axle, and the member for connecting or interlocking the hub to the axle, and also of the adjustable bearing for the outer end of the wheel hub. Fig. 5, is an end view of the nut for adjusting the outer hub bearing, and the member for locking the said nut to its adjusted position. Fig. 6, is a sectional view on the line 6—6 of Fig. 2. Fig. 7, is a sectional view of the wheel hub, the adjacent end of the axle, and the interlocking and holding members for the shaft and hub, the parts being shown separated.

Referring now to the accompanying drawings, in which 1 is a compensating gear housing and 2 and $2^a$ the axle housings which have their inner ends suitably bolted to the compensating gear housing at 3 in any desired manner. A truss-rod 4 has its central portion supporting the under side of the compensating gear housing, and its outer ends 5 connected with the outer ends of the said axle housings through the medium of a brake supporting member 6 which is carried by the outer ends of the said housings.

The compensating gear may be of any of the well known forms, but the preferred form is that here shown, and it consists of a beveled gear 7 which is connected with a two-part sub-housing 8 that incloses the compensating pinions 9. This housing is divided on a line transverse the driving axle, and the bolts 10 serve to unite the two parts 8, connect the gear 7 therewith, and to form bearings or supports for the compensating pinions 9. Placed within this two-part housing, are the axle driving pinions 11, which engage with the said compensating pinions 9 in a manner well understood by those skilled in this art. Each of these axle driving pinions 11 are journaled in the two-part housing 8, preferably by providing the pinions with outwardly-projecting flanges 12 which are journaled in outwardly-projecting flanges 14 extending from the two parts of the housing 8. These pinions 11 are provided with concentric openings 15 so shaped as to interlock with the inner ends of the two sections 16 and $16^a$ of the driving axle. That is to say, the said openings and the inner ends of the sections of the driving shaft are made of a corresponding interlocking form. As here shown, the interlocking form is substantially rectangular, though it may be of other forms, as will be readily understood. These interlocking forms will preferably be a snug fit, but will readily permit the removal and insertion of the inner ends of the sections of the driving shaft.

From the foregoing, it will be seen that the said axle driving pinions 11 are journaled in and supported by the housing 8 independently of the sections of the axle. The housing 8 is in turn journaled in and supported by the compensating gear housing 1, in the following manner. Each part of the housing 8 is provided with an outwardly projecting flange 17, upon which is supported an adjustable cone 18. Located and movably supported in the compensating gear housing 1 are the two cones 19, and located between the cones 18 and 19 are suitable roller or ball bearings 20. While we have here shown this particular form of bearing, it will be readily understood that any desired form of bearing between the compensating gear and its housing may be used, the main object of which is, to support or journal the compensating gear in the housing, so that it is held independent of the sections of the driving shaft, and thus journaled in alinement therewith.

For the purpose of permitting access to the adjustable bearings, and for the purpose of permitting the ready insertion and removal of the compensating gear in the housing 1, the said housing consists of two longitudinal sections 1$^a$ and 1$^b$ which are suitably bolted together by members 21. The removal of the upper horizontal section of the compensating gear housing, will permit access to the adjustable nuts 22 for adjusting the bearings of the housing 8.

Journaled in a forward extension 23 of the compensating gear housing, is a drive shaft 24 which carries at its inner end a pinion 25 meshing with the beveled gear 7, and the shaft 24 is operatively connected with the motor in any suitable manner. The motor is not here shown, as it forms no part of the present invention.

Referring now to the manner of supporting and journaling the driving wheels 26$^a$ attention is directed to the fact that the axle housing sections 2 and 2$^a$ are elongated and pass through the hubs 27 of the said wheels 26$^a$. The elongated ends 27 of these axle housing sections, extend to and preferably in a line with the outer ends 28 of the wheel hubs, as shown. Located upon the extension 27' of said axle housing, is a cone-bearing 29, and located around this cone-bearing 29 and carried by the hub 26 of the wheel, is a cone-bearing 30. Placed between these cone-bearings is a suitable roller or ball bearing 31. At the outer end of the hub 26 is also a cone-bearing 32, and longitudinally adjustable upon an extension 27' is a cone-bearing 33, and between these two cone-bearings is located a suitable roller or ball bearing 34. Placed upon the screw-threaded outer end 35 is an adjustable nut 36, and located outside of the nut 36 is a locking member 37. This locking member consists of a ring provided with a plurality of pin openings 38 and an inwardly-extending lip or projection 39. The lip or extension 39 projects into a longitudinal slot 40 of the axle housing, which will prevent the locking ring from turning. Formed in the nut 36 is a transverse opening 41 in which is placed a pin 42, and this pin is adapted to pass through any one of the openings 38 of the rim and be secured by a cotter-pin 43. The foregoing details are clearly shown in Figs. 4 and 5. By means of this construction, the bearings for the supporting and driving wheels 26$^a$ are adjustable.

Referring now to the manner of locking the outer ends of the shaft sections to the hubs 26 of the supporting and driving wheels, which is clearly shown in the enlarged Fig. 4, consists in providing a removable member 44 which is adapted to interlock with the hub, and with the outer end of the axle section. For this purpose the outer edge of the hub 26 is provided with one or more recesses 45, and the member 44 is provided with a corresponding number of projections 46, the arrangement of the projections and the recesses may be reversed, as will be readily understood, so long as the member 44 and the hub are constructed to interlock, that portion of our present invention will be effected. It is also necessary that this member 44 should interlock with the outer end 16$^b$ of the shaft section, and this may be accomplished in various ways. The preferred manner, however, is by providing the member 44 with an outwardly-projecting elongated portion or sleeve 47, which has a longitudinal opening 48 of a shape corresponding to the end 16$^b$ of the shaft section and adapted to interlock therewith. The form of the opening 48 and of the end of the shaft section is preferably approximately rectangular, as here shown. This member 44 is shaped to be in the nature of a housing which incloses the adjustable bearing and the end of the shaft housing, and also receives the projecting end of the shaft section, as clearly shown in Fig. 4. The interlocking member is held in position by means of a hub cap 49 which completely incloses the member 44 and is screwed upon the hub 26, as shown at 50. This hub cap is locked in position by means of a screw 51 which is placed at the junction of the inner edge of the cap and the hub, and interlocks with the recesses in both members made to receive the head of the screw, as will be readily understood. Preferably, a fiber washer 52 is placed between the outer end of the driving shaft and the hub cap, and a fiber washer 53 is also placed between the adjacent inner ends of the driving shaft sections 16 and 16ª, as shown in Fig. 1.

From the foregoing description, it will be understood that the shaft may be readily and quickly removed by simply removing the hub cap 49 and the interlocking member 44. It will also be understood that the differential gearing may be removed by drawing out the two axle sections sufficiently to disengage the inner ends from the differential pinions, and removing the upper horizontal section of the differential housing. It will also be observed that the axle sections do not in any manner support either the driving wheels or the differentials, as is usually the case. Owing to this construction, the driving shaft is not subjected to the weight of the load, and is not so liable to injury. Furthermore, the construction greatly facilitates the assembling of the axle, as the differential gearing is supported in alinement always to interlock with its inner end.

Having thus described our invention, what we claim and desire to secure by Letters Patent, is:—

1. A supporting and driving mechanism for motor vehicles, comprising a differential housing having outwardly-projecting axle housings, a differential gearing case having outwardly-projecting hollow hubs supported and journaled in said housing, supporting and driving wheels embracing and journaled upon the outer ends of the axle housings, differential gearing in said gear case having pinions concentrically supported by and journaled in said gear casing, and two continuous shaft sections having their inner ends connected with and wholly supported by said pinions, and their outer ends connected with and wholly supported by said driving and supporting wheels.

2. A supporting and driving mechanism for motor vehicles, comprising a differential housing, having projecting therefrom axle section housings, supporting and driving wheels journaled on the outer ends of the axle housings, a differential gearing journaled upon and within the differential housing, and axle sections passing loosely through the axle housings and having their ends detachably connected with and supported by the wheel hubs and the differential gearing independent of the axle and differential housings.

3. A differential gear, comprising a case divided in a direction transverse its axis, a gearing supported therein including planetary pinions, and clamping bolts forming the double function of bearings for said pinions and clamping members for holding the parts of the case together.

4. A supporting and driving mechanism for motor vehicles, comprising a differential housing having oppositely projecting axle housings, differential gearing, driving and supporting wheels embracing and journaled on and supported by the ends of the axle housings, the wheels carrying brake drums, co-acting brake members also supported by said axle housings, and shaft sections extending through the axle housings and having their ends connected respectively with the driving wheels and differential gearing, whereby all the braking strain is received by the axle housing independent of the shaft sections.

In testimony whereof we affix our signatures in presence of two witnesses.

ALEXANDER WINTON.
HAROLD B. ANDERSON.

Witnesses:
ORLAN F. BAUGHMAN,
AMOS S. NEWTON.